United States Patent
Weitzel et al.

[11] Patent Number: 5,989,332
[45] Date of Patent: Nov. 23, 1999

[54] SLURRY CONTAINING AN AGGLOMERATED CARBONATE-CONTAINING PIGMENT

[75] Inventors: Hans-Joachim Weitzel, Wikon; Claude Wermuth, Wolfwil; Dieter Strauch, Zofingen, all of Switzerland

[73] Assignee: Pluess-Staufer AG, Oftringen, Switzerland

[21] Appl. No.: 09/122,336

[22] Filed: Jul. 24, 1998

[51] Int. Cl.$^6$ .............................. C04B 14/26; C04B 14/28
[52] U.S. Cl. .......................... 106/464; 106/463; 106/465; 106/817; 423/419.1; 423/420.2; 423/430
[58] Field of Search ..................... 106/463, 464, 106/465, 817; 423/419.1, 420.2, 430

[56] References Cited

U.S. PATENT DOCUMENTS

| | | | |
|---|---|---|---|
| 4,732,748 | 3/1988 | Stewart et al. | 423/430 |
| 4,767,464 | 8/1988 | Strauch | 106/464 |
| 5,120,365 | 6/1992 | Kogler | 106/415 |
| 5,605,568 | 2/1997 | Naydowski et al. | 106/464 |
| 5,873,935 | 2/1999 | Schachenmann et al. | 106/465 |

FOREIGN PATENT DOCUMENTS

| | | |
|---|---|---|
| 522 415 | 1/1993 | European Pat. Off. . |
| 0531685A1 | 3/1993 | European Pat. Off. . |
| 4128570A1 | 3/1993 | Germany . |
| WO 96/32448 | 10/1996 | WIPO . |

OTHER PUBLICATIONS

JAPIO Patent Abstract No. JP356167760A, abstract of Japanese Patent Specification No. 56–167760; Dec, 1981.
WPIDS Abstract No. 83–797964, abstract of Japanese Patent Specification No. 58–156097; Sep. 1983.
WPIDS Abstract No. 98–148014, abstract of Great Britain Patent Specification No. 2317167; Mar. 1998.

*Primary Examiner*—Anthony Green
*Attorney, Agent, or Firm*—Townsend and Townsend and Crew LLP

[57] ABSTRACT

A slurry containing water, carbonate-containing pigment, and dispersant consisting of 25–70 % by weight of agglomerated carbonate-containing pigment, 0.1–1.0% by weight of a dispersant, the balance being water up to 100%, can be used advantageously in papermaking as well as in the paint and lacquer industry. In a novel process for agglomerating ultra-fine particles in slurries the slurry is subjected to heat treatment until the agglomeration is complete.

30 Claims, No Drawings

SLURRY CONTAINING AN AGGLOMERATED CARBONATE-CONTAINING PIGMENT

The present invention relates to a slurry containing water, carbonate-containing pigment and a dispersant, as well as to methods for the preparation thereof and to the use of said slurry in papermaking.

Mineral fillers and pigments are relatively cheap substances which are, for example, added to materials, paints, paper, plastics, and the like, to increase the volume and/or weight but often also to improve the technical usability thereof.

For example, a group of calcium carbonate pigments consists of naturally occuring materials. These include, for example, limestone, marble, chalk, as well as shells of marine or coastal organisms, such as oyster shells.

Generally, mineral fillers have to be ground to make them useful for the various possible applications. According to the state of the art, commercial carbonate-containing fillers are prepared as follows:

Carbonate-containing raw materials are obtained worldwide by opencast or underground quarrying. The quarried carbonate-containing raw materials together with inorganic or organic contaminations which depend on the area of winning are purified and then subjected to dry and/or wet processing. A preliminary comminution is performed by ball milling and, if necessary, subsequent flotation.

Such starting materials are subjected to further wet grinding at a solids content of 30–75% by weight using agitator-ball mills. It is possible to choose conditions so that products having a fineness of 50–100% by weight <2 $\mu$m are obtained with and without dispersant.

U.S. Pat. No. 4,767,464 already discloses carbonate-containing pigments which may be used, e.g. in inks and papers.

A slurry is already known from DE 4 128 570 A1 which contains carbonate-containing mineral fillers, pigments, or similar materials and which may be used in paper industry.

Generally speaking, the particle size has a significant effect on the properties of the product containing the filler, for example on the opacity. Mineral fillers, even though they have been very finely ground, still have a negative effect on the quality of products, e.g. on the opacity. Therefore, according to the prior art it has been attempted in several ways to improve the properties of mineral fillers particularly for use in paper pulps, and in particular it has been attempted to improve the opacity.

In this respect there have already been attempts to decrease the proportion of particles smaller than 0.2 $\mu$m as much as possible and if possible to zero. Reference is made to DE 28 08 425 which describes a mineral filler having an upper section of 2 $\mu$m, 85–95% by weight of particles <1 $\mu$m, and if possible containing no particles <0.2 $\mu$m.

To date, these attempts have only led to unsatisfactory results. Therefore, precipitated calcium carbonates (in the following abbreviated as PCC) have been used to achieve a higher opacity in papers as with natural calcium carbonates.

However, these precipitated calcium carbonates themselves show disadvantages known to the skilled artisan, e.g. inferior dewatering on the paper making machine and inferior strength properties of the papers.

Therefore, it is an object of the present invention to provide a slurry of the genus mentioned above resulting in an as high as possible opacity in the paper. In particular, the invention is based on the object of providing said slurry resulting in the same or even in higher opacities as compared to the commercially used precipitated calcium carbonate.

According to the invention, this object has been achieved by a slurry characterized in that said slurry consists of 25–70% by weight of agglomerated carbonate-containing pigment and 0.1–1.0% by weight of a dispersant or combination of dispersants with the balance being water up to 100% by weight, wherein the agglomerated carbonate-containg pigment has the following fineness characteristics a) 80–99% by weight <2 $\mu$m;
b) 50–90% by weight <1 $\mu$m;
c) 0–10% by weight <0.2 $\mu$m; and
d) a contrast factor of 1.5–2.0; and
e) a porosity of 45–65%;

and wherein such dispersants or dispersant combinations are used which are known per se or commercially available, respectively, which prevent the agglomerates of the agglomerated carbonate-containing pigments in the slurry from being destroyed.

Preferably, there are contained in the slurry from 26–69% by weight of agglomerated carbonate-containing pigment, more preferably from 27–67% by weight of carbonate-containing pigment and preferably from 28–65% by weight of carbonate-containing pigment.

Preferably, in the slurry there are contained from 0.15 to 0.95% by weight, more preferably 0.17–0.9% by weight, and preferably 0.2–0.88% by weight of a dispersant or dispersant combination.

Preferably, the slurry contains pigments having the following fineness a) 82–98% by weight <2 $\mu$m;
b) 51–89% by weight <1 $\mu$m;
c) 0–9% by weight <0.2 $\mu$m; more preferably
a) 83–98% by weight <2 $\mu$m;
b) 54–88% by weight <1 $\mu$m;
c) 0–8% by weight <0.2 $\mu$m; and preferably
a) 84–97% by weight <2 $\mu$m;
b) 55–85% by weight <1 $\mu$m;
c) 0–7% by weight <0.2 $\mu$m.

Preferably, the contrast factor ranges from 1.5–1.9. Very good results will be achieved with a contrast factor of 1.5–1.8. Quite particularly good results will be obtained at a contrast factor of 1.5–1.75.

The porosity preferably is 47–65%, more preferred is a porosity of 49–63%, with a porosity of 51–61% being preferred.

As dispersants, there are preferably used cationic dispersants. Cationic dispersants include commercial quarternary ammonium compounds (for details concerning "cationic dispersants" see DE 37 30 833 and DE 37 07 221).

It is further preferred to use cationic and anionic dispersants in combination. Anionic dispersants include commercial polyacrylic acids.

If combinations of dispersants are used according to the invention, those are not prepared previously by mixing but are admixed individually one after the other into the slurry, the cationic dispersants being preferably admixed first.

As dispersants there are preferably used
acrylic acid and/or
acrylic esters and/or
acrylamides and/or
acrylamide-halogenides, in particular
acrylamide-chlorides and/or
acrylate-halogenides, in particular
acrylate-chlorides and/or
copolymers of the above dispersants and/or polyacrylic acid or the methacrylic acid compounds corresponding to the above listed compounds.

Preferably, the dispersant combination is a copolymer of the monomers a α) N-tri-alkyl-amino-alkyl-methacrylate a β) acrylic acid;

copolymer of the monomers b α) N-alkyl-N'-trialkyl-amino-acrylamide b β) N-trialkyl-amino-alkyl acrylate c) polyacrylic acid.

Preferably, the dispersant combination is a copolymer of the monomers a α) N-tri-methyl-amino-ethyl methacrylate-chloride a β) acrylic acid;

copolymer of the monomers b α) N-propyl-N'-trimethyl-amino-acrylamide-chloride b β) N-trimethyl-amino-ethyl acrylate-chloride c) polyacrylic acid.

Preferably, the carbonate-containing pigments consist of chalk and/or limestone and/or marble and/or dolomitic calcium carbonate and/or dolomite or of natural chalk and/or limestone and/or marble and/or dolomitic calcium carbonate and/or dolomite.

In the following, the technical terms mentioned in the above-disclosed solution of the present object will be defined using terms known in the art and by references which are readily available in the art, describing also the measuring methods:

Measuring methods used:

Grain size distribution:

All of the fineness characteristics of the products prepared according to the invention and of the products for comparison mentioned in the present application were determined by sedimentation analysis in gravity field using the Sedigraph 5100 device of Micromeritics Company, USA. This apparatus is known to persons of ordinary skill in the art and is used worldwide for fineness determinations of fillers and pigments.

The samples were prepared for fineness measurements as follows:

A slurry sample containing 3 g (atro) of carbonate-containing pigment was added with 0.1% by weight of polyacrylic acid. This sample was filled up to 75 ml with 0.3% aqueous cationic dispersant solution and dispersed by means of a high-speed stirrer (20.000 rpm) for 1 min and sonication for 10 min.

As cationic dispersant solution, there was used:

A copolymer consisting of:

a) N-propyl-N'-trimethylamino-acrylamide and b) a polyacrylic acid.

Most conveniently, the ratio of a) to b) will be 95 mole % to 5 mole %.

The grain size distribution measured is expressed in tabular form as the transient sum curve.

The result print-out may be programmed to enable the direct reading of all the fineness characteristics contained therein.

Contrast factor:

The contrast factor may be calculated by the following formula:

$$\text{Contrast factor} = \frac{\text{Particle diameter in } \mu m \text{ at } 50\% \text{ by wt.}}{\text{Particle diameter in } \mu m \text{ at } 20\% \text{ by wt.}}$$

Porosity:

Porosity measurements were performed using an Hg-Pore Sizer 9310 device of Micromeritics Company, USA.

The measurement procedure is based on the continuous penetration of mercury into the open pores of a sample or a body under vacuum conditions up to 20 psia (corresponding to 138 kPa) as well as under high-pressure conditions up to 25.000 psia (corresponding to 172.400 kPa).

According to Washburn, the pressure is inversely proportional to the diameter of a cylindrical body enabling the penetration of mercury according to the equation given below. The penetrated volume of Hg is calculated as the cumulative pore volume per gram of sample by the change in capacity in cm$^3$/g.

$$\text{Pore diameter} = \frac{-4 \cdot \gamma \cdot \cos\sigma}{\text{Pressure}}$$

γ=surface tension of mercury

σ=angle of contact between mercury and tested material

Most conveniently, the angle of contact will be 130°.

The percentage porosity of the sample is calculated by the following formula:

$$P = \frac{V_p \text{ total} - V_p \text{ macro}}{V_P \text{ micro} - \dfrac{1}{\rho_M}}$$

$V_P$ total=total pore volume per quantity of sample in cm$^3$/g $V_P$ macro=volume of macropores per quantity of sample in cm$^3$/g $V_P$ micro=volume of micropores per quantity of sample in cm$^3$/g $\rho_M$=sample density;

wherein pores >10 μm are considered as macropores.

Paper opacity and whiteness:

Measurement of the opacity being a measure for the light transmission of paper was performed using laboratory sheets by means of a Datacolor ELREPHO 2000 type spectrophotometer according to DIN 53 146.

Measurement of the paper whiteness is performed according to ISO standard Brightness R 457 in Tappi filter+uv light using a Datacolor ELREPHO 2000 or 3300 spectrophotometer. The measurement is carried out through a paper stack of 10 sheets in order to avoid translucency effects of the paper.

Bending resistance:

The bending resistance was tested according to DIN 53 123 using laboratory sheets by means of an SE 017 test instrument of Lorentzen & Wettre Company, Sweden.

Testing of the bending resistance may be carried out with papers having area densities from 35 g/m$^2$ up to a thickness of 2 mm. The bending resistance is determined in longitudinal and transverse directions on the sheet.

Paper strips having a width of 15 mm and a length of 150 mm are cut. Then, the weight is measured by means of an analytical balance and the area density is determined in g/m$^2$.

The paper strip to be measured is oscillated by stimulation. The length of the paper strip until resonance is achieved is measured. The higher the resistance of the paper strip the longer will be the test length determined in mm. Ten measurements each are performed in longitudinal and transverse direction to the sheet.

$$\text{Bending resistance } S = \frac{20}{1000} \cdot \left(\frac{L}{100}\right)^4 \cdot \left(\frac{M_A}{100}\right) \text{ in mNm}$$

$M_A$=area density in g/m$^2$

L=resonance length in mm.

Light scattering coefficient S according to Kubelka and Munk:

Determination of the light scattering coefficient S (in m$^2$/kg) and the light absorption coefficient K (in m$^2$/kg) of the paper sheets is performed according to the following method of determination: reflection values are measured with a Datacolor ELREPHO 2000 spectrophotometer. In addition, the area density X of the paper is calculated (in g/m$^2$).

Formula terms:

$R_0$=reflection value of a single sheet against a black background $R_\infty$=reflection value of "infinite" sheets against a black background X=area density of the paper S=scattering coefficient, i.e. proportion of a light quantity back scattered by a material layer of a thickness of 1

K=absorption coefficient, i.e. proportion of a quantity of light absorbed by a material layer of a thickness of 1.

The following formulas are used for calculating the light scattering coefficient:

$$S = \frac{X}{b} \cdot \text{arccoth}\left(\frac{1 - a \cdot R_0}{b \cdot R_0}\right)$$

$$a = \frac{1}{2} \cdot \left(\frac{1}{R_\infty} + R_\infty\right) \text{ and } b = \frac{1}{2} \cdot \left(\frac{1}{R_\infty} - R_\infty\right)$$

$$K = \frac{S \cdot (1 - R_\infty)^2}{2 \cdot R_\infty}$$

According to the invention, any dispersant and any dispersant combination may be used which act to inhibit the destruction of agglomerates of agglomerated carbonate-containing pigment in the slurry. For this purpose, suitable commercial dispersants may be employed. Preferred dispersants to which, however, the invention is not limited have been described above.

Destruction of agglomerates upon addition of unsuitable dispersants may be monitored by determination of the fineness as described above. If the above described fineness characteristics are obtained, then the dispersant or the dispersant combination, respectively, has met its requirement.

In the context of this invention, there have also been prepared and evaluated dried products obtained from the agglomerated slurries. Although the opacity values obtained were not as high as those obtained with the above-described, i.e. concentrated, slurries these products are also advantageous within the context of the invention.

The dried pigment product according to the invention consists of 100% by wt. of agglomerated carbonate-containing pigment wherein the agglomerated carbonate-containing pigment shows the following fineness characteristics a) 80–99% by weight <2 µm;

b) 50–90% by weight <1 µm;

c) 0–10% by weight <0.2 µm; and d) a contrast factor of 1.5–2.0; and e) a porosity of 45–65%.

Surprisingly, there has been found according to the invention that the object of the invention, that is to improve the opacity, may be solved by converting ultra-fine particles of the pigment prepared which are known to be optically ineffective into an optically effective particle size by means of agglomeration.

In the following, there will be described the preparation of test products according to the invention:

First, a general method of preparation according to the invention will be described, and then there will be outlined further embodiments of the method of preparation according to the invention with respect to specific uses of the products of the invention.

General method of preparation:

1) A starting material processed according to the prior art (see page 2 above) is subjected to further wet grinding at a solids content of 25–40% by weight by means of an agitator-ball mill having grinding elements of 1–2 mm in diameter without dispersant to obtain a fineness of 50–90% by weight <1 µm.

2) Subsequent heat treatment without added dispersant results in agglomeration of the ultra-fine pigment particles.

3) Then, the agglomerated slurry—if necessary with regard to the final product—is dewatered mechanically or by heat, e.g. by centrifuges, chamber filter presses, or thermal dewatering facilities, namely to 25–70% by weight of pigment.

4) Eventually, such dispersants known per se or commercially available, respectively, are added under stirring which ensure that agglomerates according to process steps 2 and 3 are preserved.

Conveniently, the above-disclosed dry pigment product is prepared by carrying out process step 3 (concentration) which follows the agglomeration step (process step 2) up to 100% by weight of pigment instead of up to 70% by weight of pigment. In this case, process step 4 may be omitted, i.e. the final product does not contain any dispersant.

Process step 2 (thermal agglomeration) is carried out as detailed below:

The slurry obtained according to process step 1 is placed in a heatable agitation vessel with good insulation. Preferably, the agitation vessel is constructed to avoid as far as possible the loss of water during agglomeration (such as by using a condensation means). Then, the slurry is agitated (preferably slowly agitated) at a temperature of 65° C. to 80° C. over a period until the required agglomeration is complete. This is monitored by obtaining samples in suitable intervals, e.g. in intervals of two hours, and measuring the grain size distribution thereof. If the pigment of the slurry exhibits the fineness characteristics (grain size distribution and contrast factor) of the invention the agglomeration is complete.

Preparation of the products according to the invention

EXAMPLE 1

25 kg of floatated, preground, and dry Norwegian marble was used to prepare by addition of water a 35% by weight slurry having a fineness of $d_{50}$=12 µm (50% by wt. <12 µm). This slurry was ground in a 12 l agitator-ball mill (Drais company) in circular operation. Grinding conditions were set to 10 m/s peripheral speed and 4 l/min speed of flow.

The fineness determined after 115 minutes of grinding was: 91% by weight <2 µm, 66% by weight <1 µm, 7% by weight <0.2 µm, contrast factor (ratio of diameter at 50% by wt. to diameter at 20% by wt.)=2.0.

Then, the slurry was further subjected to heat treatment at 65° C. in a 7 l double-walled vessel without addition of dispersant. After 20 hours of thermal agglomeration, the following finenesses were measured: 58% by weight <1 μm, 0% by weight <0.2 μm, with a contrast factor of 1.69.

No subsequent concentration step was carried out.

Dispersion of the slurry was done using 0.17% by weight of the dispersant combination described below consisting of
a) N-trimethylamino ethyl methacrylate chloride/acrylic acid copolymer; and
b) N-propyl-N'-trimethylamino acrylamide chloride/N-trimethylamino ethyl acrylate chloride copolymer; and
c) a polyacrylic acid The following ratio was chosen
a)=5 parts and b)=5 parts and c)=1 part The solids content was 40% by weight and the fineness was 58% by weight <1 μm, 0% by weight <0.2 μm, with a contrast factor of 1.78.

EXAMPLE 2

25 kg of floatated, preground, dry Norwegian marble was ground for 180 minutes as described in Example 1. The resulting fineness was: 98% by weight <2 μm, 82% by weight <1 μm, 11% by weight <0.2 μm, with a contrast factor of 1.96.

After 16 hours of thermal agglomeration the fineness was 81% by weight <1 μm, 4% by weight <0.2 μm, with a contrast factor of 1.55.

No concentration step was carried out.

Dispersing was performed with 0.33% by weight of the dispersant combination described in Example 1.

The final solids content was 40% by weight, with a fineness of 82% by weight <1 μm, 4% by weight <0.2 μm, and a contrast factor of 1.58.

The products prepared in Examples 1 and 2 may be used at an on-site facility.

Carbonate-containing slurries for which no concentration is necessary may be used directly as fillers in the paper making process. The slurry concentration should be higher than 25% by weight. No dewatering step is required for fillers prepared in this way, and these products are superior because of their lower production costs.

EXAMPLE 3

25 kg of floatated, preground, dry Norwegian marble was ground as described in Example 1.

After 115 minutes of grinding the fineness characteristics were measured with a Sedigraph 5100.

The fineness was 91% by weight <2 μm, 66% by weight <1 μm, 7% by weight <0.2 μm, with a contrast factor of 2.0.

Afterwards, the slurry was slowly agitated in a double-walled vessel at 65° C. for 20 hours and thereby agglomerated.

A fineness of 58% by weight <1 μm, 0% by weight <0.2 μm was achieved, the contrast factor being 1.69.

By carrying out a treatment under shortwave heat radiation and discharging of the water the slurry was brought to a concentration of 50% by weight.

The slurry concentrated in this way was stabilized by adding 0.25% by weight of a dispersant combination of
a) N-trimethylamino ethyl methacrylate chloride/acrylic acid copolymer
b) N-propyl-N'-trimethylamino acrylamide chloride/N-trimethylamino ethyl acrylate chloride copolymer
c) polyacrylic acid
in a ratio of a:b:c=5:5:1.

The resulting fineness was 59% by weight <1 μm and 0% by weight <0.2 μm, with a contrast factor of 1.72.

EXAMPLE 4

25 kg of floatated, preground, dry Norwegian marble was ground for 180 minutes as in Example 1.

Fineness: 98% by weight <2 μm, 82% by weight <1 μm, 11% by weight <0.2 μm, contrast factor: 1.96.

After 16 h of thermal agglomeration: fineness 81% by weight <1 μm, 4% by weight <0.2 μm, contrast factor: 1.55.

After concentration to 50% by weight and dispersing with 0.5% by weight of the dispersant combination described in Example 1 the fineness was 81% by weight <1 μm, 7% by weight <0.2 μm, and the contrast factor was 1.76.

The products prepared in Examples 3 and 4 are useful as standard slurries in concentrations up to 70% by weight.

Following wet grinding in an agitator-ball mill at 25–40% by weight without addition of dispersant, the resulting carbonate-containing slurry product was agglomerated prior to dewatering in a thermostated agitation vessel under agitation for 5–35 hours. The temperature is selected between 50–85° C. The solids content is adjusted to enable easy stirring of the slurry without thickening. Viscosity adjustment is carried out by addition of water. The resulting agglomerated slurry is then dewatered, and is brought to a solids content of 50–70% by weight mechanically or by heat, e.g. by centrifuge, chamber-filter press or a thermal dewatering facility.

EXAMPLE 5

25 kg of floatated, preground, dry Norwegian marble was ground for 115 minutes as in Example 1.

Fineness: 91% by weight <2 μm, 66% by weight <1 μm, 7% by weight <0.2 μm, contrast factor: 2.0.

After 20 h of thermal agglomeration: fineness 58% by weight <1 μm, 0% by weight <0.2 μm, contrast factor: 1.69. The product was spray-dried until constant weight was achieved.

Fineness: 60% by weight <1 μm, 4% by weight <0.2 μm, contrast factor 1.77.

The product prepared in this way is useful as a dry pigment.

Note: All of the thermal agglomeration steps of Examples 1–5 were performed at 65° C.

Dispersion of the slurries of the invention in all of the Examples was carried out according to process step 4:

The required amount of dispersant was added to the slurry in an 1 l agitation vessel. Dispersion was performed at room temperature using a dissolver disk having a diameter of 50 mm for one hour. The peripheral speed of the disk was 8–10 m/s.

The Examples cited above as well as the Tables below lack information concerning the fineness in % by weight at 2 μm because this value is not altered during the agglomeration.

Description of the products for comparison:

As a standard for natural calcium carbonate (NCC) there was used a commercially available cationically dispersed product HYDROCARB HO of Hustadmarmor Company (Elnesvågen, N).

The slurry has a solids content of 67% by weight and shows the following fineness characteristics:

87% by weight <2 μm, 60% by weight <1 μm, 6% by weight <0.5 μm, and the contrast factor being 2.0.

As a comparative product for precipitated calcium carbonate (PCC) there was chosen a commercial filler product known per se named Albacar HO of Specialty Minerals Incorporation Company (Bethlehem, USA). This precipitated calcium carbonate which is available in dry form is used as a standard for papers with high opacity.

Fineness characteristics: 66% by weight <2 μm, 22% by weight <1 μm, 4% by weight <0.5 μm.

Contrast factor: 1.8

TABLE 1

Fineness characteristics of Examples and commercial products

| Examples | Solids % by wt. | Amount of dispersant % by wt. | Fineness <1 μm % | Fineness <0.5 μm % | Fineness <0.2 μm % | Contrast factor | Hg porosity % |
|---|---|---|---|---|---|---|---|
| No. 1 | 40 | 0.17 | 58 | 21 | 0 | 1.78 | 53.5 |
| No. 2 | 40 | 0.33 | 82 | 36 | 4 | 1.58 | 56.0 |
| No. 3 | 50 | 0.25 | 59 | 20 | 0 | 1.72 | 51.1 |
| No. 4 | 50 | 0.50 | 81 | 40 | 7 | 1.76 | 52.5 |
| No. 5 | 100 | none | 60 | 22 | 4 | 1.77 | 52.6 |
| For comparison: NCC standard | 67 | 0.21 | 60 | 26 | 6 | 2.0 | 44.3 |
| For comparison: PCC standard | 100 | none | 22 | 9 | 4 | 1.80 | 75.6 |

PRACTICAL EXAMPLES

Preparation and testing in paper manufacture 45 g (atro) of a mixture of fibrous substances having a solids content of 20% by weight and consisting of 80% by weight of birch sulfate cellulose and of 20% by weight of pine sulfate cellulose was diluted to 6 l of water and homogenized under agitation. The necessary amount of filler was subjected to slurrying in about 500 ml of water, added to the mixture of fibrous substances, filled up to 10 l, and stirred further for 15 minutes.

The amount of filler/fibrous mixture calculated for the area of one sheet was removed, added with 1.25 ml of a 0.108% solution of Prastearat PK 30 (cat. retention agent, Chemische Fabrik Stockhausen, Krefeld, Germany) and agitated for 20 seconds.

Afterwards, this mixture was transferred to the sheet forming column of a Rapid-Köthen sheet former in which the sheet is formed with 7 l of water by swirling, calming and suction. Then, the sheet is dried for 6 minutes under vacuum (70 mbar) at 105° C. Monitoring of the area density and the filler content was done by analytical balance and ashing of the sheet.

Sheets having a pigment content of 20% by weight and an area density of 75 g/m² were formed.

TABLE 2

Testing of the optical properties in the paper pulp

| | Filler | | | Paper | |
|---|---|---|---|---|---|
| Examples | Fineness <1 μm % | Fineness <0.2 μm % | Solids % by wt. | Scattering coefficient m²/kg | Paper opacity % |
| No. 1 | 58 | 0 | 40 | 62.5 | 87.9 |
| No. 2 | 82 | 4 | 40 | 67.1 | 89.2 |
| No. 3 | 59 | 0 | 50 | 63.9 | 88.4 |
| No. 4 | 81 | 7 | 50 | 68.5 | 89.4 |
| No. 5 | 60 | 4 | 100 | 60.8 | 88.2 |
| For comparison: NCC standard | 60 | 6 | 65 | 61.3 | 87.6 |
| For comparison: PCC standard | 22 | 4 | 100 | 65.3 | 88.1 |

The above Table 2 convincingly shows that the object of the present invention has been achieved, i.e. to provide slurries of the genus mentioned above for papermaking which result in an as high as possible opacity in the paper, and in particular result in the same or even higher opacities as compared to commercially used calcium carbonates and commercially used precipitated calcium carbonates.

Furthermore, surprisingly, with the agglomerated test products according to the invention there has been measured a high paper opacity together with an improved paper strength as compared to the NCC standard product.

In the preparation of papers having a high opacity normally a loss in paper strength is encountered. However, to prepare a superior paper a high bending resistance of the paper is desired. The products prepared using Example 3 of the invention surprisingly show an improvement of the bending resistance of about 10% compared to the NCC standard together with a clearly improved opacity, as will be seen from the following Table 3.

Table 2 shows that, surprisingly, according to the invention besides an improvement in the opacity also the scattering coefficient of the papers has been improved indicating a further improvement in the optical properties of the papers.

TABLE 3

Testing of the mechanical properties in paper manufacture

| | Filler | | | Paper | |
|---|---|---|---|---|---|
| Examples | Fineness <1 μm % | Fineness <0.2 μm % | Solids % by wt. | Paper opacity % | Bending resistance mNm |
| No. 3 | 59 | 0 | 50 | 88.4 | 0.294 |
| NCC standard | 60 | 6 | 65 | 87.6 | 0.271 |
| For comparison: PCC standard | 22 | 4 | 100 | 88.1 | 0.312 |

The slurry of the invention and the dry pigment product of the invention may be advantageously used by the paper manufacturers, in particular in the paper pulp of coated papers and cards as well as in the paint and lacquer industry in particular for the preparation of aqueous paint systems.

What is claimed is:

1. A slurry comprising:
   25–70% by weight of agglomerated carbonate-containing pigment having the following fineness characteristics:
   80–99% by weight <2 μm;
   50–90% by weight <1 μm;
   0–10% by weight <0.2 μm;
   a contrast factor of 1.5–2.0; and
   a porosity of 45–65%;
   0.1–1.0% by weight of at least one dispersant; and
   water.

2. A slurry according to claim 1 wherein agglomeration of said carbonate-containing pigment is effected by subjecting the slurry to a heat treatment and wherein said at least one dispersant prevents agglomerates of said agglomerated carbonate-containing pigment in the slurry from being destroyed.

3. A slurry according to claim 1 wherein said agglomerated carbonate-containing pigment includes at least one substance selected from the group consisting of chalk, limestone, marble, dolomitic calcium carbonate, dolomite, natural chalk, natural limestone, natural dolomitic calcium carbonate, and natural dolomite.

4. A slurry according to claim 1 wherein said at least one dispersant comprises at least one cationic dispersant.

5. A slurry according to claim 4 wherein said at least one dispersant comprises at least one anionic dispersant.

6. A slurry according to claim 5 wherein said at least one anionic dispersant includes polyacrylic acid.

7. A slurry according to claim 4 wherein said at least one cationic dispersant includes quaternary ammonium compounds.

8. A slurry according to claim 1 wherein said at least one dispersant includes at least one substance selected from the group consisting of
   acrylic acid,
   acrylic esters,
   acrylamides,
   acrylamide-halogenides,
   acrylate-halogenides,
   copolymers of acrylic acid, acrylic esters, acrylamides, acrylamide-halogenides, and acrylate-halogenides; and
   polyacrylic acid compounds or methacrylic acid compounds corresponding to said acrylic acid, acrylic esters, acrylamides, acrylamide-halogenides, acrylate-halogenides, and copolymers.

9. A slurry according to claim 8 wherein said acrylamide-halogenides comprise acrylamide-chlorides.

10. A slurry according to claim 8 wherein said acrylate-halogenides comprise acrylate-chlorides.

11. A slurry according to claim 1 wherein said at least one dispersant comprises:
   a copolymer of the monomers N-tri-alkyl-amino-alkyl-methacrylate and acrylic acid;
   a copolymer of the monomers N-alkyl-N'-trialkyl-amino-acrylamide and N-trialkyl-amino-alkyl acrylate; and
   polyacrylic acid.

12. A slurry according to claim 1 wherein said at least one dispersant comprises:
   a copolymer of the monomers N-tri-methyl-amino-ethyl methacrylate-chloride and acrylic acid;
   a copolymer of the monomers N-propyl-N'-trimethyl-amino-acrylamide-chloride and N-trimethyl-amino-ethyl acrylate-chloride; and
   polyacrylic acid.

13. A slurry according to claim 1 comprising 26–69% by weight of said agglomerated carbonate-containing pigment.

14. A slurry according to claim 13 comprising 27–67% by weight of said agglomerated carbonate-containing pigment.

15. A slurry according to claim 14 comprising 28–65% by weight of said agglomerated carbonate-containing pigment.

16. A slurry according to claim 1 comprising 0.15–0.95% by weight of said at least one dispersant.

17. A slurry according to claim 16 comprising 0.17–0.9% by weight of said at least one dispersant.

18. A slurry according to claim 17 comprising 0.2–0.88% by weight of said at least one dispersant.

19. A slurry according to claim 1 wherein said agglomerated carbonate-containing pigment has the following fineness characteristics:
   82–98% by weight <2 μm;
   51–89% by weight <1 μm; and
   0–9% by weight <0.2 μm.

20. A slurry according to claim 19 wherein said agglomerated carbonate-containing pigment has the following fineness characteristics:
   83–98% by weight <2 μm;
   54–88% by weight <1 μm; and
   0–8% by weight <0.2 μm.

21. A slurry according to claim 20 wherein said agglomerated carbonate-containing pigment has the following fineness characteristics:
   84–97% by weight <2 μm;
   55–85% by weight <1 μm; and
   0–7% by weight <0.2 μm.

22. A slurry according to claim 1 wherein the contrast factor of said agglomerated carbonate-containing pigment is 1.5–1.9.

23. A slurry according to claim 22 wherein the contrast factor of said agglomerated carbonate-containing pigment is 1.5–1.8.

24. A slurry according to claim 23 wherein the contrast factor of said agglomerated carbonate-containing pigment is 1.5–1.75.

25. A slurry according to claim 1 wherein the porosity of said agglomerated carbonate-containing pigment is 47–65%.

26. A slurry according to claim 24 wherein the porosity of said agglomerated carbonate-containing pigment is 49–63%.

27. A slurry according to claim 26 wherein the porosity of said agglomerated carbonate-containing pigment is 51–61%.

28. A process for preparing a slurry, the process comprising:

subjecting a carbonate-containing raw material to wet grinding at a solids content of 25–40% by weight without dispersant to obtain particles having a fineness of 50–90% by weight <1 $\mu$m;

heat-treating said particles to effect agglomeration of said particles without added dispersant to form an agglomerated slurry;

adding dispersants to said agglomerated slurry and stirring said dispersant and said agglomerated slurry to form a slurry comprising:
  25–70% by weight of agglomerated carbonate-containing pigment having the following fineness characteristics:
    80–99% by weight <2 $\mu$m,
    50–90% by weight <1 $\mu$m;
    0–10% by weight <0.2 $\mu$m;
    a contrast factor of 1.5–2.0; and
    a porosity of 45–65%;
  0.1–1.0% by weight of at least one dispersant; and
  water.

29. A process according to claim 28 further comprising dewatering the agglomerated slurry to obtain a solids content of 25–70% by weight of pigment.

30. A process according to claim 28 wherein said particles are heated to a temperature of 65° C. to 80° C. under stirring.

* * * * *